United States Patent

Alanara et al.

Patent Number: 5,845,205
Date of Patent: Dec. 1, 1998

[54] FULLY AUTOMATIC CREDIT CARD CALLING SYSTEM

[75] Inventors: Seppo M. Alanara, Siionintie; Markku J. Halonen, Kanervatie; Jaakko S. Vanttila, Mustaherukkatie, all of Finland

[73] Assignee: Nokia Mobile Phones Ltd., Salo, Finland

[21] Appl. No.: 904,748

[22] Filed: Aug. 1, 1997

Related U.S. Application Data

[63] Continuation of Ser. No. 460,079, Jun. 2, 1995, abandoned.

[51] Int. Cl.$^6$ .................................................. H04Q 7/32
[52] U.S. Cl. .......................... 455/564; 455/407; 379/144
[58] Field of Search .................................. 455/406, 407, 455/403, 414, 422, 550, 564–565; 379/91.01, 111, 114, 143–145, 354–356

[56] References Cited

U.S. PATENT DOCUMENTS

| | | | |
|---|---|---|---|
| 5,046,085 | 9/1991 | Godsey et al. | 379/63 X |
| 5,068,891 | 11/1991 | Marshall | 379/91 |
| 5,134,717 | 7/1992 | Rasmussen | 455/89 |
| 5,138,650 | 8/1992 | Stahl et al. | 379/61 |
| 5,173,933 | 12/1992 | Jabs et al. | 379/58 |
| 5,266,782 | 11/1993 | Alanara et al. | 235/380 |
| 5,272,747 | 12/1993 | Meads | 379/59 |
| 5,315,638 | 5/1994 | Mukari | 379/58 |
| 5,353,328 | 10/1994 | Jokimies | 379/58 |
| 5,359,182 | 10/1994 | Schilling | 235/380 |
| 5,359,643 | 10/1994 | Gammino | 379/144 X |
| 5,448,622 | 9/1995 | Huttunen | 379/58 |
| 5,450,479 | 9/1995 | Alesio et al. | 379/144 |
| 5,487,084 | 1/1996 | Lindholm | 375/215 |
| 5,491,745 | 2/1996 | Roeder | 379/355 |
| 5,509,056 | 4/1996 | Ericsson et al. | 379/58 X |
| 5,550,897 | 8/1996 | Seiderman | 379/59 |

FOREIGN PATENT DOCUMENTS

WO 94/11849  5/1994  WIPO.

*Primary Examiner*—Dwayne D. Bost
*Assistant Examiner*—William G. Trost
*Attorney, Agent, or Firm*—Perman & Green LLP

[57] ABSTRACT

A method for a cellular telephone automatic credit card calling system. In the analysis method, a series of program steps are provided for a digital signal processor (DSP) in the cellular telephone that activates the digital signal processor to listen to and analyze the received voice signals. The method may be considered as including three parts. (1) Tone detection method using the DSP to listen to the tone received from the calling card company. (2) Initializing the mobile phone for calling card use by selecting a default method on the ground of the telephone number of the calling card company. (3) Setting up a card call using the above mentioned tone detection (1), automatic insertion of "0" in front of the dialed number and call activation by a long press of the SEND-key. All of the three parts are manifested on the sequence of calling card process steps and implementation in the mobile telephone.

7 Claims, 2 Drawing Sheets

FIG. I.

FULLY AUTOMATIC CREDIT CARD CALLING SYSTEM

This application is a continuation of application Ser. No. 08/460,079 filed on Jun. 2, 1995, now abandoned.

BACKGROUND OF THE INVENTION

1. Field of the Invention

The present invention relates to credit card systems for mobile telephones, and more particularly to a method that provides a fully automatic credit card calling system for mobile telephones without manual prompting.

2. Description of the Background Art

Previous calling card systems include manual prompting implementations wherein the user needs to enter the directory number to the phone and then press and hold the send key for about 2 seconds to activate the card call. The card number has been prestored to the phone semipermanent memory. According to calling card company the phone then calls automatically to the appropriate service center 800 number. After a voice call to the service center has been established, the user gets a prompt to listen to prompt tone and after hearing it, he must send the directory number using DTMF tones. After the directory number has been sent by DTMF, the user gets a prompt to listen to prompt tone and after hearing it, the user sends the calling card number using again the DTMF signalling. After the service center has verified the calling card number, it sends an acknowledgement tone and activates the call.

In another previous calling card technique used by Oki Electric Industry Co., Ltd., the user sets the calling card call as a default feature from the phone's menu. After choosing the card call as a default, it is the only way to activate a call. The setting can be changed only via phone's menu.

When making a call, call charges can be directed to a calling card if the card number is sent to the network during the call setup. No physical credit cards are needed in order to direct the call charges to the credit card. Instead, credit card calls are created by sending the number of the credit card to the network as part of the call setup procedure. There are several different calling card companies, each of which uses a slightly different call setup procedure.

There are four basic known calling card dialing sequences that can be employed when manually using calling cards.

Direct Method without Access Number

There are four steps in the manual method.
1. The user dials 0+area code+phone number (or international calls; international prefix i.e. 01 or 011+country code+city code+phone number).
2. The user listen for a tone.
3. The user enters the calling card number.
4. The user listens for an acknowledgement tone.

The direct method could also be called as "one Tone Method without Access Number", since the user once waits for a tone.

Direct Method with Access Number

There are four steps in the manual method.
1. The user dials an access number+0+area code+phone number (or international calls: an access number+ international prefix i.e. 01 or 011+country code+city code+phone number).
2. The user listen for a tone.
3. The user enters the calling card number.
4. The user listens for an acknowledgement tone.

The direct method could also be called as "One Tone Method with Access Number", since the user once waits for a tone.

1-800 Method

There are six steps in the manual 1-800 Method.
1. The user dials 1-800 access number.
2. The user listen for a tone.
3. The user dials 0+area code+phone number (or international calls: international prefix i.e. 01 or 011+country code+city code+phone number).
4. The user listen for a tone again.
5. The user enters the call card number.
6. The user listens for an acknowledgment tone.

The 1-800 method could also be called as "Two Tone Method", since the user twice waits for a tone.

AT&T Alternate Method

There is only one step in the manual method.
1. The user dials 10+ATT ("288")+0+area code+phone number+the card number (for national calls). This method could also be called "No Tone Method", since the user does not need to wait any tone.

SUMMARY OF THE INVENTION

An object of the present invention is to provide a fully automatic credit card calling system for mobile telephones.

Still another object of the present invention is to provide an automatic calling card system having a tone detection method using a digital signal processor (DSP) to listen to the tone received from a selected calling card company.

A further object of the present invention is to provide an automatic calling card system that initializes the mobile phone for calling card use by selecting by default method (1-800 or some other) on the ground of the telephone number of the calling card company.

A still further object of the present invention is to provide an automatic calling card system that includes methods for setting up a card call using tone detection, automatic insertion of "0" or replacing the long distance prefix "1" with "0" in front of the dialed number and call activation by a long press of the SEND-key.

Other and further features, advantages and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention and, together with the description, serve to explain the principles of the invention in general terms. Like numbers refer to like parts throughout the disclosure.

DETAILED DESCRIPTION OF THE PREFERRED EMBODIMENT

In previously available mobile telephones as described, the use of the calling card was implemented so that the user was required to listen to the network prompt tones and, after hearing the prompt tones, the user was required to press a button to time the calling card number dialing. In the present invention, a method for a mobile telephone apparatus is provided wherein the prompt tones from the telephone network are listened to automatically using a digital signal processor.

The aforesaid prompt tones are tones transmitted from the calling card control center and which are received by the mobile telephone terminal after the mobile telephone terminal has established a call, that is, an active voice path, to the calling card control center.

In the present invention, an analysis method, such as a series of program steps, are provided for the digital signal processor that activates the digital signal processor to listen to and analyze the received voice signals.

For ease of use, the analysis is performed in the mobile telephone terminal.

The present invention may be considered as including three parts. (1) Tone detection method using the DSP to listen to the stored tone provided by the calling card service company. (2) Initializing the mobile phone for calling card use by selecting a default method (1-800 or some other) on the ground of the telephone number of the calling card service provider. (3) Setting up a card call using the above mentioned tone detection (1), automatic insertion of "0" in front of the dialed number and call activation by a long press of the SEND-key. All of the three parts are manifested on the sequence of calling card process steps and implementation in the mobile telephone.

In the EEPROM memory which is located in the controller unit of the cellular telephone, there is storage space allocated for the card information, so that the user can store the card service provider access numbers, card names and calling card numbers (or card account number or authorization code) to memory and automatically make calling card calls. There is space for several cards information in the phone's memory, and the memory area is separate from the normal abbreviated dialing memory.

The particular default credit card service provider names are stored in the EEPROM memory of the phone, but there are no default card provider access number or card account numbers stored. The user can add, change, and remove all these fields freely by himself via the menu.

Figure 1:
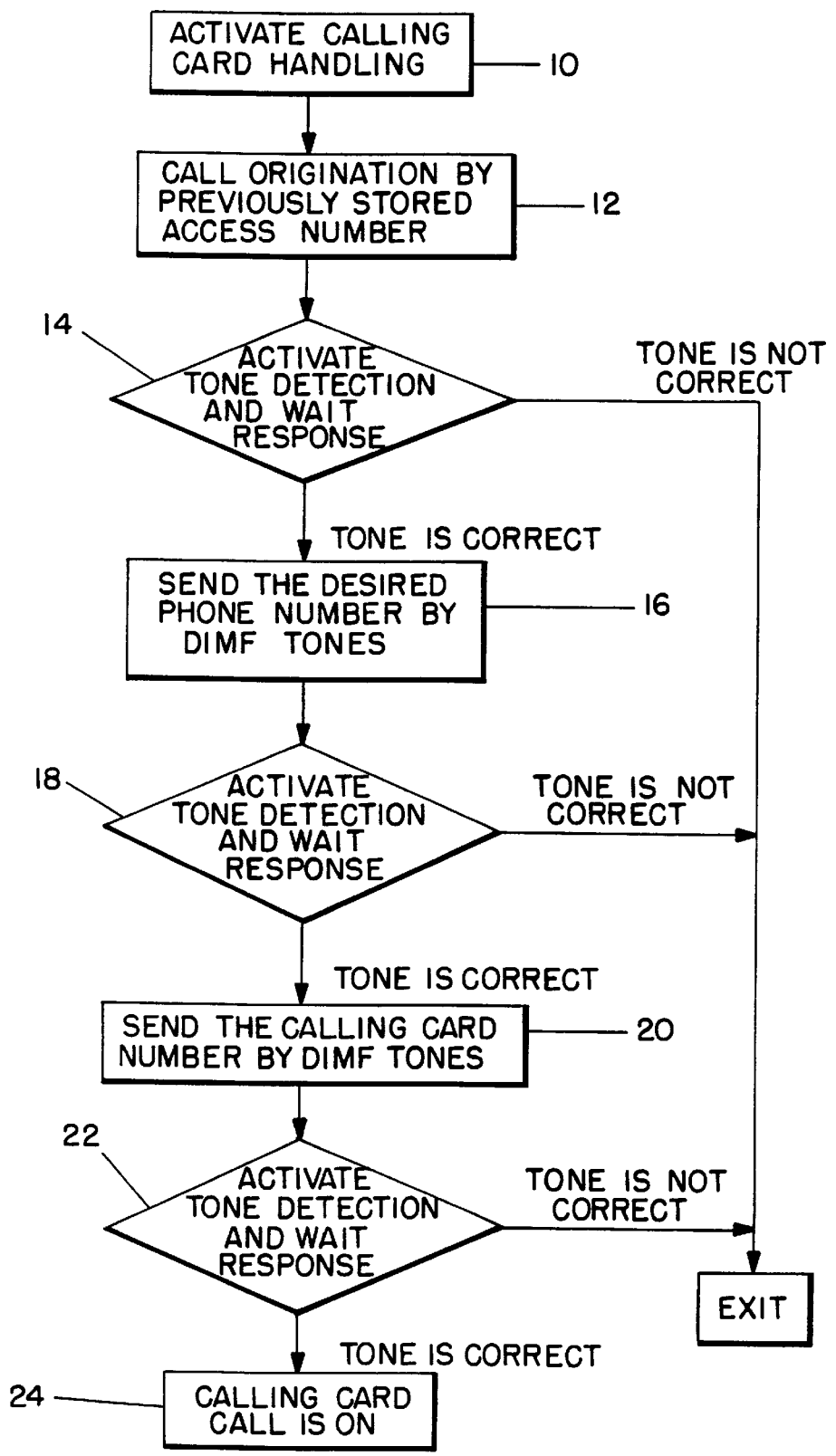
FIG. 1 is a schematic diagram illustrating the process steps for an embodiment of the method for an automatic credit card calling system according to the principles of the present invention.

Referring to FIG. 1, the method steps for a tone detector embodiment of the present invention are illustrated in the form of a flow chart.

The first step 10 is the activation of the calling card handling by the user dialing the desired telephone number on the telephone's alpha-numeric keyboard and then holding down the "send" key. Alternatively the telephone number may be entered by reparatory dialing information or using prestored telephone numbers.

The second step 12 is call origination by a previously stored access number which may be stored in the memory of the cellular telephone's controller unit. This step is carried out after the user presses and holds the "send" key in step 10 for greater than a given time period. The "previously stored access number" in second step 12 is the prestored card number of the calling card service provider in the phone's semipermanent memory (EEPROM). If the "Direct Method without Access Number" calling card sequence described previously herein is used, second step 12 is not employed.

In the third step 14, which is used only when the previously described "1-800 Method" is used, a tone detection unit in a digital signal processor is activated and a response is awaited from the service provider in the form of tone signals. If the response indicated that the tone is not correct, the process is terminated. If the tone is correct, the target (desired) phone number is sent to the telephone network for the calling card service by dual tone multi-frequency (DTMF) tones in the fourth step 16.

In the fifth step 18 the tone detection procedure of the digital signal processor is activated. If the tone is not correct, the process is terminated. If the tone is correct, the calling card number is sent in the sixth step 20 to the telephone network by standard dual tone multi-frequency (DTMF) tones. In the seventh step 22 the tone detection procedure is again activated. If the tone is not correct, the process is terminated. If the tone is correct, then in the eighth step 24 the calling card call is "on" meaning that the telephone call will proceed.

In an alternative embodiment of the method the calling card number of the sixth step 20 may be sent along with the telephone number in the fourth step 16. The tone detection step in the fifth step 18 will therefore determine if both the telephone number and the credit card number are correct at the same time and in the same step. If both are correct the method proceeds from fifth step 18 directly to eighth step 24.

Figure 2:
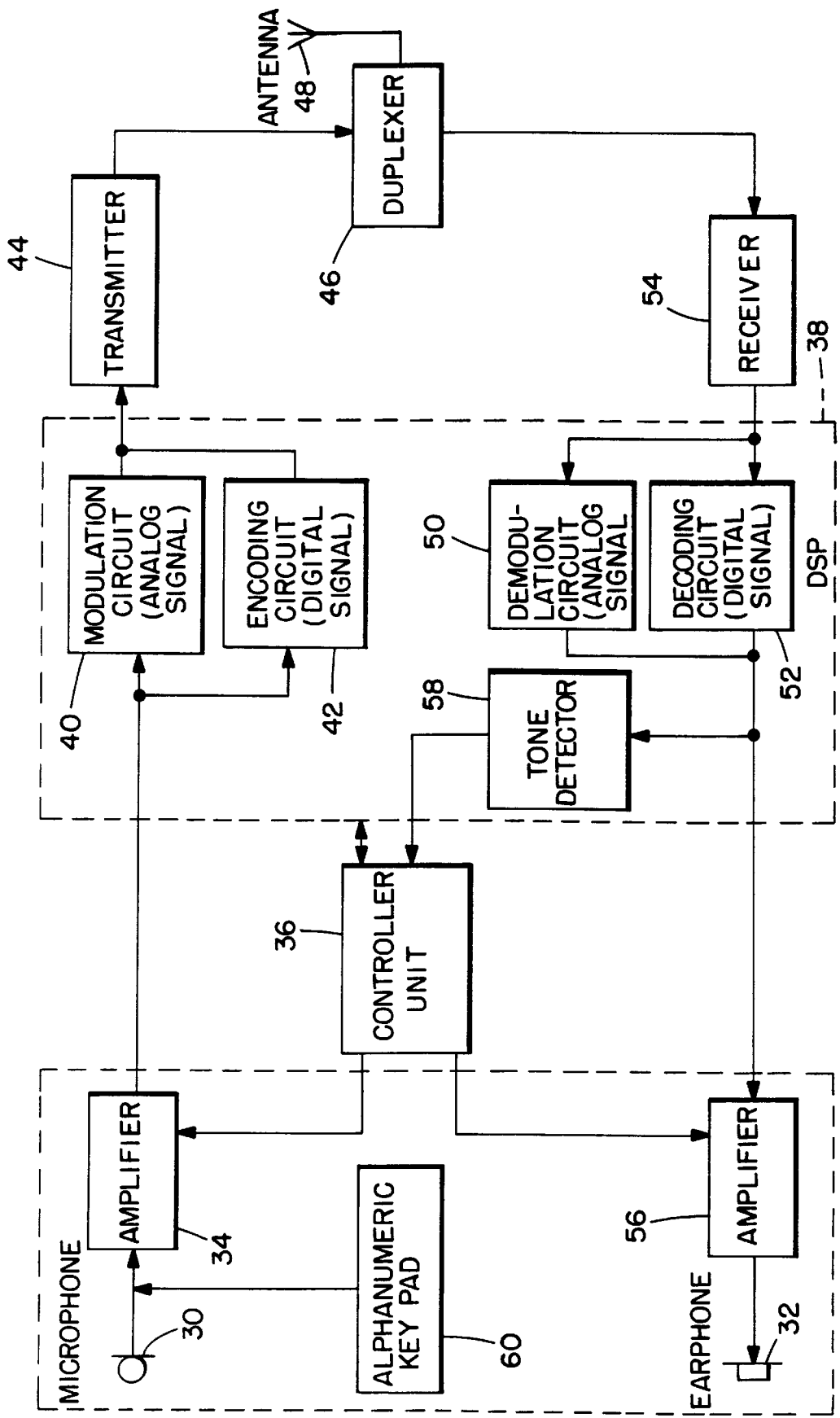
FIG. 2 is a schematic block diagram of an embodiment of an automatic credit card calling system employed to carry out the method of the present invention.

Referring to FIG. 2, a schematic block diagram is illustrated showing a cellular telephone circuit embodiment that carries out the automatic tone detection method of the present invention. The cellular phone circuit illustrated in FIG. 2 "listens" to the tone received from the particular calling card service provides being employed. The methods of setting up a calling card call (direct without access number, direct with access number, 1-800 method and AT&T alternate method have been previously discussed.

In FIG. 2, the circuit includes a microphone 30 into which the user speaks and an earphone 32 from which the user listens. The microphone 30 and the earphone 32 are standard components of a cellular telephone handset along with an alpha-numeric keypad 60 for providing the tones produced when the user operates the cellular phone. Microphone 30 is connected to a controller unit 36 via an amplifier 34 and earphone 32 is connected to controller unit 36 via amplifier 56.

Controller 36 is a microprocessor containing an EEPROM that controls the entire cellular telephone. FIG. 2 further includes a digital signal processor (DSP) 38 that includes a modulation circuit 40 that provides an analog modulating output signal and further includes memory units to store reference tone information. The tones from amplifier 34 are also connected to an encoding circuit 42 in DSP circuit 38 that digitally encodes the tones from amplifier 34. The digitally encoded tone signals from encoding circuit 42 are analog modulated by the signal from modulation circuit 40 and are sent to transmitter 44. The signal from transmitter 44 is passed through duplexer circuit 46 to antenna 48.

The DSP circuit 38 also includes a demodulation circuit 50 and a decoding circuit 52 which are connected to an incoming tone signal from receiver 54 which is responsive to an incoming signal from antenna 48 that is passed through duplexer circuit 46. The incoming tone signal is demodulated by circuit 50 and decoded by circuit 52 and then passed through amplifier 56 to earphone 32. The demodulated, decoded tone signal is also sent to tone detector software 58 that provides a signal indicative of a received tone signal to controller circuit 36.

It is the tone detector 58 that analyzes the incoming tones from the credit card service provides on the telephone network as set forth in Step three (14) Step five (18) and Step seven (22) of the method as shown in FIG. 1. More particularly, the tone detector 58 detects tones that match reference tones of the calling card company stored in the memory in DSP 38. If the tones are correct, a signal is sent to controller 36 of FIG. 2. Controller 36 proceeds to send the numbers embodied as tone signals to the telephone network as described in Step four (16) and Step six (20) in method illustrated in FIG. 1.

The circuit components of FIG. 2 are used in most digital and dual mode cellular telephones and will be understood by one skilled in the art.

What has been described is a method for a fully automatic credit card calling system for mobile telephones including a tone detection technique using a digital signal processor (DSP) to listen to the tone received from a selected calling card service provider.

While the invention has been described in connection with a preferred embodiment, it is not intended to limit the scope of the invention to the particular form set forth, but, on the contrary, it is intended to cover such alternatives, modifications, and equivalence as may be included within the spirit and scope of the invention as defined in the appended claims.

What is claimed is:

1. In a mobile cellular telephone having a key pad connected to a controller unit and a digital signal processor containing stored data and a tone detection unit, a method for using automatic credit card calling with the cellular telephone comprising the steps of:

Step 1 originating a call over a telephone network for the calling card service provider using a previously stored calling card service provider access number;

Step 2 sending the telephone number to the service provider;

Step 3 activating the tone detection digital signal processing procedure and awaiting a tone signal response from the service provider to verify whether the desired telephone number is correct;

Step 3A terminating the telephone call if an incorrect response is received;

Step 4 sending the calling card number to the telephone network;

Step 5 activating a tone detection digital signal processing procedure and awaiting a tone signal response from the service provider to verify whether the calling card number is correct;

Step 5A terminating the telephone call if an incorrect response is received in Step 5;

Step 6 automatically proceeding with the calling card call when all the telephone credit card call information has been determined to be correct.

2. A method according to claim 1 wherein, between Steps 1 and 2 includes the steps of:

Step 1A activating a fully automatic tone detection digital signal processing procedure to verify determine whether the stored access number tone signals are correct and to provide a signal to said controller unit when said stored access number tone signals are correct;

Step 1B terminating the telephone call if the access number is incorrect.

3. A method according to claim 1 wherein said Step 1 includes introducing a desired telephone number and depressing a send key of the cellular telephone keypad for a selected time period after the desired telephone number is entered.

4. A method according to claim 3 wherein a "0", an area code and a telephone number are introduced into the cellular telephone.

5. A method according to claim 4 wherein an international prefix is formatted and introduced into the cellular telephone.

6. A method according to claim 1 wherein said Step 1 further includes initializing the cellular telephone for calling card operation by selecting a default method sequence of a calling card service provider.

7. A method according to claim 1 wherein, in Step 1, a "1-800" access number is dialed, in response to a tone a "0", an area code and a telephone number is introduced onto the cellular telephone and another tone is awaited.

* * * * *

UNITED STATES PATENT AND TRADEMARK OFFICE
CERTIFICATE OF CORRECTION

PATENT NO. : 5,845,205
DATED : Dec. 1, 1998
INVENTOR(S) : Alanara et al.

It is certified that error appears in the above-identified patent and that said Letters Patent is hereby corrected as shown below:

IN THE CLAIMS:

Column 5, line 32, change "the" to --a--
line 35, change "the" to --a desired--
line 37, change "the" to --a--
Column 6, line 1, change "the" to --a--,
line 1 through 2, change "telephone network" to --service provider--
line 9, change "calling card" to --credit card--
line 10, change "all the telephone credit card call information" to --the desired telephone number and the calling card number--
line 10, change "has" to --have--
line 14, change "a fully" to --an--
line 15 - 16, change "determine whether the" to --whether a--
line 16, change "tone signals are" to --is--
line 18, change "tone signals are" to --is--
line 20, after the word "the" insert --stored--.

Signed and Sealed this

Eleventh Day of May, 1999

Attest:

Q. TODD DICKINSON

Attesting Officer

Acting Commissioner of Patents and Trademarks